United States Patent
Morales Morales et al.

(10) Patent No.: US 11,734,832 B1
(45) Date of Patent: *Aug. 22, 2023

(54) PREDICTION ON TOP-DOWN SCENES BASED ON OBJECT MOTION

(71) Applicant: Zoox, Inc., Foster City, CA (US)

(72) Inventors: Andres Guillermo Morales Morales, San Francisco, CA (US); Marin Kobilarov, Baltimore, MD (US); Gowtham Garimella, Dublin, CA (US); Kai Zhenyu Wang, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/649,690

(22) Filed: Feb. 2, 2022

Related U.S. Application Data

(63) Continuation of application No. 16/719,780, filed on Dec. 18, 2019, now Pat. No. 11,276,179.

(51) Int. Cl.
*G06N 3/08* (2023.01)
*G06T 7/20* (2017.01)
(Continued)

(52) U.S. Cl.
CPC .............. *G06T 7/20* (2013.01); *G05D 1/0221* (2013.01); *G05D 1/0231* (2013.01); *G06N 3/045* (2023.01);
(Continued)

(58) Field of Classification Search
CPC ... G06T 7/20; G06T 7/70; G06T 11/20; G06T 2207/20084; G06T 2207/30261;
(Continued)

(56) References Cited

U.S. PATENT DOCUMENTS 11,276,179 B2 * 3/2022 Morales Morales ........................ G05D 1/0088
2013/0054106 A1 2/2013 Schmudderich et al.
(Continued)

OTHER PUBLICATIONS

Office Action for U.S. Appl. No. 16/719,780, dated Jul. 30, 2021, Morales, "Prediction on Top-Down Scenes Based on Object Motion", 28 pages.
(Continued)

*Primary Examiner* — Charlotte M Baker
(74) *Attorney, Agent, or Firm* — Lee & Hayes, P.C.

(57) ABSTRACT

Techniques for determining predictions on a top-down representation of an environment based on object movement are discussed herein. Sensors of a first vehicle (such as an autonomous vehicle) may capture sensor data of an environment, which may include object(s) separate from the first vehicle (e.g., a vehicle, a pedestrian, a bicycle). A multi-channel image representing a top-down view of the object(s) and the environment may be generated based in part on the sensor data. Environmental data (object extents, velocities, lane positions, crosswalks, etc.) may also be encoded in the image. Multiple images may be generated representing the environment over time and input into a prediction system configured to output a trajectory template (e.g., general intent for future movement) and a predicted trajectory (e.g., more accurate predicted movement) associated with each object. The prediction system may include a machine learned model configured to output the trajectory template(s) and the predicted trajector(ies).

20 Claims, 7 Drawing Sheets

(51) Int. Cl.
  *G06T 11/20*   (2006.01)
  *G06T 7/70*    (2017.01)
  *G05D 1/02*    (2020.01)
  *G06V 20/58*   (2022.01)
  *G06V 30/262*  (2022.01)
  *G06N 3/045*   (2023.01)

(52) U.S. Cl.
  CPC ............... *G06N 3/08* (2013.01); *G06T 7/70* (2017.01); *G06T 11/20* (2013.01); *G06V 20/58* (2022.01); *G06V 30/274* (2022.01); *G05D 2201/0213* (2013.01); *G06T 2207/20084* (2013.01); *G06T 2207/30261* (2013.01); *G06T 2210/12* (2013.01)

(58) Field of Classification Search
  CPC .............. G06T 2210/12; G05D 1/0221; G05D 1/0231; G05D 2201/0213; G06N 3/045; G06N 3/08; G06V 20/58; G06V 30/274

USPC .......................................................... 382/259
  See application file for complete search history.

(56) References Cited

U.S. PATENT DOCUMENTS

| | | |
|---|---|---|
| 2017/0297488 A1 | 10/2017 | Wang et al. |
| 2019/0179023 A1 | 6/2019 | Englard et al. |
| 2019/0291720 A1 | 9/2019 | Xiao et al. |
| 2020/0074266 A1* | 3/2020 | Peake ................. G06F 18/2411 |
| 2020/0410260 A1* | 12/2020 | Choe ..................... G06T 11/203 |
| 2021/0150230 A1* | 5/2021 | Smolyanskiy ......... G06V 20/56 |
| 2021/0192748 A1 | 6/2021 | Morales Morales et al. |

OTHER PUBLICATIONS

The PCT Search Report and Written Opinion dated Mar. 25, 2021 for PCT application No. PCT/US20/64184, 10 pages.

* cited by examiner

PREDICTION ON TOP-DOWN SCENES BASED ON OBJECT MOTION

CROSS-REFERENCE TO RELATED APPLICATION

This application is a continuation of and claims priority to U.S. application Ser. No. 16/719,780, filed on Dec. 18, 2019 and entitled "PREDICTION ON TOP-DOWN SCENES BASED ON OBJECT MOTION," the entirety of which is incorporated herein by reference.

BACKGROUND

Prediction techniques can be used to determine future states of entities in an environment. That is, prediction techniques can be used to determine how a particular entity is likely to behave in the future. Current prediction techniques often involve physics-based modeling or rules-of-the-road simulations to predict future states of entities in an environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
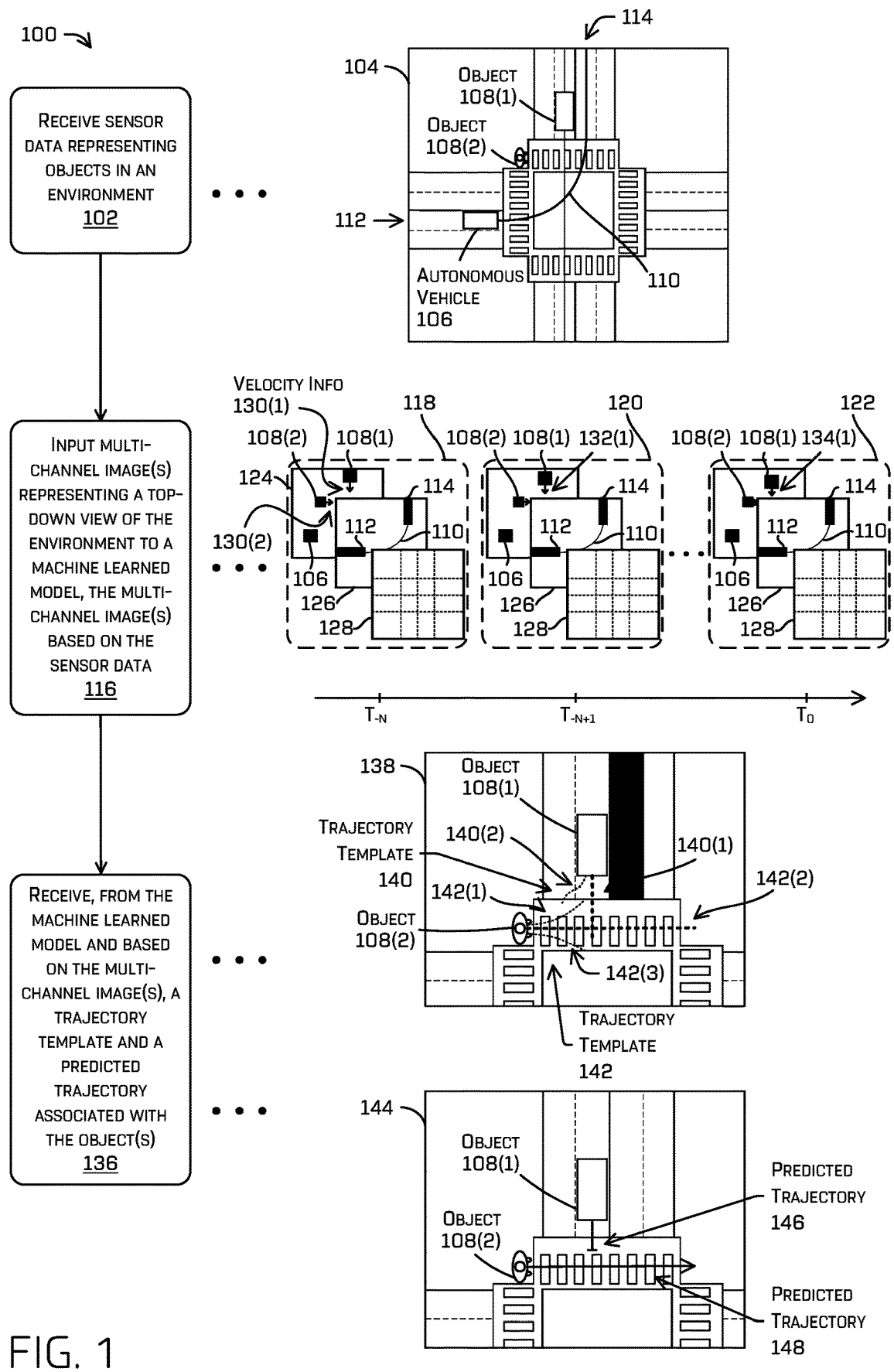
FIG. 1 is a pictorial flow diagram of an example process for receiving sensor data, inputting a multi-channel image representing the environment into a machine learned model, and receiving a trajectory template and predicted trajectory associated with an object in the environment, in accordance with examples of the disclosure.

Techniques for determining predicted trajectories of objects in an environment based on a top-down representation of an environment are discussed herein. For example, sensors of an autonomous vehicle may capture sensor data of an environment, which may include objects separate from the autonomous vehicle, such as other vehicles, bicyclists, pedestrians, or the like. An image representing the environment from a top-down perspective may be generated based at least in part on the sensor data. In some examples, the images may include semantic information associated with the environment and/or the object. With respect to the object, such semantic information may comprise a bounding box having extents (e.g., identifying the bounding box as being associated with a vehicle), movement information associated with the bounding box (e.g., velocity, acceleration, etc.), classification information (whether the box represents a vehicle, bicyclist, pedestrian, etc.). With respect to the environment, the image may comprise semantic information indicative of road network data (e.g., identifier associated with the road network, (e.g., speed limits, road data (e.g., lane widths, lane ends, stop lines, traffic lights, etc.), traffic light states, etc.). In some examples, such images may comprise multi-channel images in which any one or more of the above pieces of information are stored in a separate channel of the image.

Multiple images may be generated representing the environment over time and input into a prediction system (e.g., a machine learning model) configured to output trajectory templates representative of future object motion (e.g., general direction the object will travel, classification of object intent) and a predicted trajectory associated with each object. In some examples, the prediction system may be configured to output a heat map comprising prediction probabilities associated with possible locations of the objects in the future. The predicted trajectories and/or prediction probabilities may be output to a planning system to control an operation of the autonomous vehicle.

Sensor data captured by the autonomous vehicle may include lidar data, radar data, image data, time of flight data, and the like. In some instances, the sensor data may be provided to a perception system configured to determine a classification associated with an object (e.g., vehicle, pedestrian, bicycle, etc.). The perception system may be configured to determine movement information associated with the objects based on the sensor data. The sensor data and data based on the sensor data may be represented in a top-down representation of the environment. For example, the top-down representation may represent the object as a two-dimensional bounding box representing the location of the object in the environment as well as an extent of the object (e.g., length, width, etc.), and a classification of the object (e.g., vehicle, bicyclist, pedestrian, etc.). Movement information, such as velocity information (e.g., kinematic information), may be represented as a velocity vector associated with the bounding box, although other representations are contemplated.

In some examples, an image input into the prediction system may be represented by individual channels of a multi-channel image where each channel may represent different information about the object and the environment in which the object is located. For example, channels may represent, but are not limited to, one or more of: road network information (e.g., semantic labels indicating lanes, crosswalks, stop lines, lane dividers, stop signs, intersections, traffic lights, etc.), traffic light status (e.g., red light, yellow light, green light, etc.), a bounding box associated with each object, a velocity associated with each object in an x-direction and a y-direction, an acceleration associated with each object, a light status of the object (e.g., left-turn, right turn, braking, reverse, hazards, no lights, etc.), and the like.

In various examples, the prediction system may receive a plurality of images (multi-channel images) representative of historical movement of the objects in the environment. In some examples, the prediction system may determine a feature map representative of the joint history of the objects in the environment. In some examples, the prediction system may determine a feature vector associated with each object based in part on the joint history and/or locations associated with each object.

In some examples, the prediction system may utilize the feature map and/or feature vectors to generate at least one trajectory template and at least one predicted trajectory associated with each object. A trajectory template (or mode) may represent a classification of intent of the object (stay in lane, change lanes, etc.). The classification of intent may include a rough estimate of future motion of the object (e.g., predicted direction of future travel), such as whether the object will continue forward, stop, turn left or right, stay in lane, etc. In various examples, the classification of intent associated with two or more objects may include joint intent. In such examples, the trajectory templates associated with a first object may be dependent on the trajectory template associated with a second object. For example, a vehicle and a pedestrian may approach an intersection with a crosswalk. The vehicle trajectory template yielding to the pedestrian may depend on the pedestrian trajectory template crossing at the crosswalk.

The predicted trajectory may represent a more precise trajectory (or a more precise estimate) of future motion of the object. In some examples, the future motion may be represented as one or more future positions of the object at one or more times in the future. In some examples, the predicted trajectory may be based on the trajectory template. In some examples, the predicted trajectory may be based on a historical movement of the object through the environment, as determined by previously captured sensor data.

In some examples, the prediction system may include a machine learning model trained to output one or more trajectory templates and/or one or more predicted trajectories. In some examples, the output may include a trajectory template and a predicted trajectory for each object detected in the environment. In some examples, the trajectory templates and predicted trajectories associated with the detected objects may represent predicted future movements of the objects, as they interact with one another (and the autonomous vehicle) in the environment. For example, the machine learning model may output coordinates (e.g., x-coordinates and y-coordinates) associated with each object (e.g., other vehicles, bicyclist, pedestrians, etc.) at one or more times in the future (e.g., 1 second, 2 seconds, 8 seconds, etc.).

In some examples, the machine learning model may output coordinates associated with the object as well as probability information associated with each coordinate. In some examples, the probability information may be represented as an ellipse or other polygon associated with a threshold probability level (e.g., a 75% probability that a location of the object at a particular time is within the area represented by an ellipse). In some examples, the probability information may comprise probability distribution(s) associated with location(s) of object(s) in the environment. In some examples, a predicted trajectory may be generated by interpolating between the coordinates output by the machine learning model.

In some examples, the machine learning model may output a heat map associated with prediction probabilities, such as that described in U.S. patent application Ser. No. 16/151,607 filed Oct. 4, 2018 and entitled "Trajectory Prediction on Top-Down Scenes," U.S. patent application Ser. No. 16/504,147 filed Jul. 5, 2019 and entitled "Prediction on Top-Down Scenes based on Action Data," and in U.S. patent application Ser. No. 15/807,521, filed Nov. 8, 2017, and entitled "Probabilistic Heat Maps for Behavior Prediction," the entire contents of each of the applications are incorporated herein by reference. A heat map may represent a discretized region of the environment proximate to the autonomous vehicle. For example, the heat map may represent a 64×64 grid (or J×K sized grid) representing a 100 meter by 100 meter region around the autonomous vehicle. Of course, the heat map may represent any size of region and may represent any number of discrete portions of the region, as described in the U.S. Patent Applications incorporated by reference above.

In various examples, the prediction system may be configured to determine the predicted trajectory based on the heat map output by the machine learning model. In such examples, the prediction system may analyze the heat map to determine a highest probability (or a probability above a threshold) associated with a cell of the heat map to determine the predicted trajectory. In various examples, the prediction system may determine the predicted trajectory based on costs and/or constraints, such as utilizing the techniques described in the U.S. Patent Applications incorporated by reference above.

In some examples, the machine learning model may include a convolutional neural network (CNN), which may include one or more recurrent neural network (RNN) layers, such as, but not limited to, long short-term memory (LSTM) layers. The machine learning model associated with the prediction system may be trained utilizing unsupervised and/or supervised learning algorithms. In some examples, the machine learning model may be trained to determine the trajectory templates utilizing unsupervised learning algorithms. In some examples, the machine learning model may determine the trajectory templates utilizing one or more clustering algorithms (e.g., k-means, hierarchical, etc.). In at least some examples, the number of trajectories with templates may be augmented by one or more of reflecting trajectories about a direction of travel and/or removing and lateral deviations from trajectories. In some examples, the machine learning model may determine the trajectory template based on one or more object locations. In such examples, the machine learning model may determine a probability distribution associated with locations of the object at a time in the future. The machine learning model may apply the clustering algorithm(s) to a grid representative of the probability distribution to determine a trajectory template associated with an object.

In some examples, the machine learning model may be trained to determine the predicted trajectories utilizing supervised learning algorithms, such as one or more regression algorithms. In various examples, a predicted trajectory of an object may be based on a trajectory template associated with the object. In some examples, the machine learning model may include one or more networks configured to determine the trajectory templates and/or the predicted trajectories. In some examples, the network(s) may be determined based on a classification associated with the object. For example, a first network may be utilized to determine a first trajectory template and/or a first predicted trajectory of a pedestrian and a second network may be utilized to determine a second trajectory template and/or a second predicted trajectory of a vehicle.

In some examples, the machine learning model may include a single network configured to determine predicted trajectories for different intents. In some examples, the machine learning model may include different networks configured to determine predicted trajectories associated with different intents. For example, a machine learning model may include a first network configured to a determine trajectory of an object with a first trajectory template, a second network configured to determine trajectory of the object with a second trajectory template, and so on.

The techniques discussed herein can improve a functioning of a computing device in a number of additional ways. In some examples, representing the environment and the object(s) in the environment as a top-down view can represent a simplified representation of the environment for the purposes of generating predicted trajectories. In some examples, the image can represent the environment without extracting particular features of the environment, which may simplify the generation of the prediction system and subsequent generation of at least one predicted trajectory.

Additionally, the image may represent interactions between objects in the environment, such as in a joint history including interactions between objects. The interactions between objects captured in the joint history may improve the accuracy of predicted trajectories associated with the objects. Such interactions may be expressly determined or may be implicitly determined by including object data associated with a plurality of objects together in the multi-channel images. In some examples, evaluating the trajectory templates and/or predicted trajectories, determined based on the joint history, may allow the autonomous vehicle to generate more accurate and/or safer trajectories for the autonomous vehicle to traverse an environment. In at least some examples, conditioning predictions based on top-down encodings of the environment may minimize (improve) a spread of a probability distribution function associated with the object, yielding safer decision-making of the system. These and other improvements to the functioning of the computer are discussed herein.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or a robotic platform), and is not limited to autonomous vehicles. In one example, similar techniques may be utilized in driver-controlled vehicles in which such a system may provide an indication of whether it is safe to perform various maneuvers. In another example, the techniques can be utilized in an aviation or nautical context, or in any system involving objects or entity that may be associated with behavior that is unknown to the system. Further, sensor data can include any two-dimensional, three-dimensional, or multi-dimensional data such as image data (e.g., stereo cameras, time-of-flight data, and the like)), lidar data, radar data, sonar data, and the like. Additionally, the techniques described herein can be used with real data (e.g., captured using sensor(s)), simulated data (e.g., generated by a simulator), or any combination of the two.

FIG. 1 is a pictorial flow diagram of an example process 100 for receiving sensor data, inputting a multi-channel image representing an environment into a machine learned model, and receiving a trajectory template and predicted trajectory associated with an object in the environment, in accordance with examples of the disclosure.

At operation 102, the process may include receiving sensor data representing objects in the environment. In some examples, the sensor data may be received from a perception system of an autonomous vehicle. For example, the sensor data may include, but is not limited to, one or more of a bounding box associated with an object, velocity and/or acceleration information associated with the object, classification information associated with the object, and the like. In some examples, the sensor data may be captured by one or more sensors on the autonomous vehicle. In some examples, the sensor data may be captured by one or more remote sensors, such as sensors associated with another vehicle, sensors mounted in the environment, or the like. For example, the sensor data may include data captured by one or more of a lidar sensor, a radar sensor, an image sensor, a time of flight sensor, a sonar sensor, and/or any other sensor associated with the autonomous vehicle, another vehicle, and/or the environment. In at least some examples, additional environmental data may be received (e.g., map data of the environment encoding portions such as lanes, reference lines, crosswalks, traffic devices and/or signs, and the like).

An example 104 illustrates an environment in which an autonomous vehicle 106 (e.g., vehicle 106) is traversing the environment. In some examples, the vehicle 106 may perform the operations of the process 100, which can include capturing the sensor data of the environment. For the purpose of discussion, a vehicle capturing (or utilizing) the sensor data can be an autonomous vehicle configured to operate according to a Level 5 classification issued by the U.S. National Highway Traffic Safety Administration, which describes a vehicle capable of performing all safety critical functions for the entire trip, with the driver (or occupant) not being expected to control the vehicle at any time. In such an example, since the vehicle can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. Additional details associated with the vehicle are described throughout this disclosure.

An object 108 is also located in the environment. In some examples, the object 108 may represent a vehicle, a pedestrian, a bicycle, and the like. The environment illustrated in the example 104 may include a drivable region and a non-drivable region. In some examples, the operation 102 may include localizing the vehicle 106 in the environment and accessing map data associated with the environment. For example, map data may comprise map elements such lane marking, lane boundaries, one or more lane references (e.g., a centerline associated with a lane and/or a route between available (e.g., legal) lanes). Additional examples of map elements can include, but are not limited to, one or more of a lane element, a bike lane element, a crosswalk element, an intersection element, a lane divider element, a traffic light element, a stop sign element, a stop line element, a yield sign element, a yield line element, a parking lane element, a driveway element, a speed bump element, jay walking regions (e.g., a virtual crosswalk), trajectory waypoints (e.g., known trajectories), passenger pickup points, a sign location element, a geofence element, and the like.

In various examples, the operation 102 may include determining a planned route 110 associated with the autonomous vehicle 106, based on a location associated with the vehicle 106 and/or the map data. In the illustrative example, the planned route 110 may include traversing an intersection from a current lane 112 to a target lane 114 associated with the map data.

In some examples, the sensor data captured in the operation 102 may be used to determine information about the object 108, including but not limited to, a type of the object (e.g., semantic information indicating a classification of the object, such as a vehicle, pedestrian, bicycle, etc.). In some examples, the operation 102 may include determining the type of the object 108, a bounding box associated with the object 108, and/or movement information associated with the object 108, as discussed herein.

At operation 116, the process may include inputting multi-channel image(s) representing a top down view of the environment to a machine learned model, the multi-channel image(s) based at least in part on the sensor data. Examples of such multi-channel image(s) are illustrated in images 118, 120, and 122. In some examples, the images 118, 120, and 122 may represent the environment depicted in example 104 over time. For example, image 118 may represent the environment at time $T_{-N}$, the image 120 may represent the environment at time $T_{-N+1}$, and the image 122 may represent the environment at time $T_0$. For example, the image 118 may represent the environment 2 seconds in the past, the image 120 may represent the environment 1 second in the past, and the image 122 may represent the environment at the present time (e.g., time=0). Of course, the images 118, 120, and 122 may represent the environment at any period in time and are not limited to the illustrative times used in the example above.

In the illustrative example, the image 118 may represent the environment at time $T_{-N}$, and may include a first channel 124, a second channel 126, and a third channel 128. In some examples, the first channel 124 may represent bounding boxes, locations, extents (e.g., length and width), etc. of the autonomous vehicle 106 and/or the objects 108, such as objects 108(1) and 108(2) in the environment. As can be understood, the image 118 may include any number of static objects (e.g., buildings, trees, curbs, sidewalks, map elements, etc.) or dynamic objects (e.g., objects capable of movement) in the environment at any time and is not limited to the two objects 108(1) and 108(2) (represented as bounding boxes) in the example.

The image 118 may further include velocity information 130(1) and 130(2) (e.g., kinematic information, motion information) associated with the objects 108(1) and 108(2), respectively. In the illustrative example, the velocity information 130(1) and 130(2) is represented as a velocity vector associated with the respective objects. Although discussed in the context of velocity, the velocity information 130(1) and 130(2) may represent information associated with acceleration (e.g., average over time, maximum acceleration observed in the time, and the like), steering angle, distance(s) from a reference line or obstacle, and the like.

As can be understood, the objects 108(1) and/or 108(2) may be associated with different locations and/or movement over time. Accordingly, the image 120 may include velocity information 132(1) that is the same or different as the velocity information 130(1), and the image 122 may include velocity information 134(1) that may be the same or different as velocity information 130(1) and/or 132(1). Similarly, velocity information associated with the object 108(2), such as velocity information 130(2), may be the same or different over time, such as represented in images 120 and 122.

In some examples, the second channel 126 may represent the planned route 110 associated with the vehicle 106. For example, the second channel 126 may illustrate the current lane 112 and/or the target lane 114 associated with the planned route 110. In some examples, the third channel 128 may represent the map data associated with the environment proximate the vehicle 106. In various examples, the third channel 128 may include data associated with a mapped region and data associated with an unmapped region (e.g., driveway, parking lot, etc.). Data associated with the unmapped region may include an indication of a lack of information associate with the region, a general size of the region, or the like. For example, a third channel may include data associated with a road and an unmapped region including a private driveway leading to the road.

As discussed above, the images 120 and 122 may represent the environment at different times (e.g., time $T_{-N+1}$, and time $T_0$). In some examples, the aspects of images 120 and 122 may be similar to the aspects of image 118. For example, the images 120 and 122 may include the first channel 124, the second channel 126, and the third channel 128, though this is merely an example, and additional channels and/or additional information associated with each channel are contemplated herein.

As can be understood, the operation 116 may include generating or determining the multi-channel image(s), as discussed herein. Examples of generating or determining multi-channel image(s) are discussed in connection with U.S. patent application Ser. No. 16/151,607, incorporated by reference herein above.

At operation 136, the process may include receiving, from the machine learned model and based on the multi-channel image(s), a trajectory template and a predicted trajectory associated with the objects (e.g., objects 108(1) and 108(2)). Example 138 illustrates trajectory templates 140 and 142 associated with objects 108(1) and 108(2), respectively. Example 144 illustrates predicted trajectories 146 and 148 associated with objects 108(1) and 108(2), respectively.

A trajectory template 140 or 142 may represent a classification of intent of future movement (e.g., predicted direction of future travel, class of motion, etc.) of the associated object 108(1) or 108(2). The classification of intent may include a rough estimate of future motion of the object 108(1) or 108(2), such as whether the object 108(1) or 108(2), will continue forward, stop, turn left or right, etc. In various examples, the classification of intent associated with two or more objects 108(1) and 108(2) may include joint intent. In such examples, the trajectory templates 140 associated with a first object 108(1) may be dependent on the trajectory template 142(2) associated with a second object 108(2), or vice versa. For example, the first object 108(1) may include a vehicle approaching an intersection to which the second object 108(2), a pedestrian, is also approaching. The trajectory templates 140(1) and 142(2) may represent one or both objects 108(1) and 108(2) yielding to the other.

In various examples, the machine learning model may be configured to determine the trajectory templates 140(1) and 142(2) associated with the objects 108(1) and 108(2) based on one or more possible future motions (e.g., possible trajectory templates 140 and 142) associated with the objects 108(1) and 108(2). Example 138 illustrates two possible trajectory templates 140(1) and 140(2) associated with object 108(1) and three possible trajectory templates 142(1), 142(2), and 142(3) associated with object 108(2). In various examples, the possible trajectory templates 140 and 142 may represent various possible future motions of the objects 108(1) and 108(2). In some examples, the possible trajectory templates 140 and 142 may be based on map data and/or map elements associated therewith, such as those included in the multi-channel image(s), as described above. For example, a possible trajectory template 140 associated with the object 108(1) may be associated with a crosswalk element. In some examples, the possible trajectory templates 140 and 142 may be independent of the map data and/or the map elements.

Although example 138 illustrates the various possible trajectory templates 140 and 142 considered by the machine learning model, it is understood that the machine learning model may output determined trajectory templates 140(1) and 142(2) associated with the objects 108(1) and 108(2), respectively. As such, at operation 136, the process may include receiving the trajectory template 140(1) associated with object 108(1) and trajectory template 142(2) associated with object 108(2).

In various examples, the machine learning model may be trained to determine the trajectory templates 140(1) and 142(2) based on a type of object (e.g., pedestrian, vehicle, bicyclist, etc.) and/or one or more scenarios (e.g., highway, junction (e.g., road split, four-way intersection, etc.)) associated with the environment. In such examples, the machine learning model may be trained utilizing training data associated with the different types of objects (e.g., object data) and/or different scenarios (e.g., scenario data, environmental data, (e.g., map data of the environment encoding portions such as lanes, reference lines, crosswalks, traffic devices and/or signs, and the like). etc.). The type of object and/or scenario(s) may be provided to the machine learning model in the multi-channel images, such as images 118, 120, and 122. For example, the images 118, 120, and 122 may represent object 108(1) as a vehicle and object 108(2) as a pedestrian, and the scenario as a four-way intersection. Based on a determination that the vehicle and the pedestrian are approaching the four-way intersection, the machine learning model may determine the trajectory templates 140(1) and 142(2) associated therewith.

In various examples, the machine learning model may be trained to determine the trajectory templates 140(1) and 142(2) utilizing unsupervised learning algorithms. In some examples, the machine learning model may utilize clustering algorithms to determine the trajectory templates 140(1) and 142(2). In at least one example, the machine learning model may utilize k-means clustering algorithms.

In various examples, the machine learning model may determine the trajectory templates 140(1) and 142(2) based on determined trajectories associated with the respective objects 108(1) and 108(2). In some examples, a determined trajectory may include an average trajectory of the respective object 108(1) or 108(2) over time. In some examples, the determined trajectory may include a cluster trajectory, with the cluster center based on the average motion of the respective object 108(1) or 108(2) over time. In various examples, the trajectories may be independent of the map data and/or map elements associated therewith. In such examples, the trajectories may be determined based on observations in a motion space, irrespective of the map data. For example, a first trajectory associated with object 108(1) may be based on observed movement of the object 108(1) irrespective of data associated with the lane the object is traveling in, road network data, or the like. For another example, a vehicle may enter into the environment from an unmapped zone (e.g., driveway, parking lot, etc.). The machine learning model may process sensor data associated with the vehicle to determine a trajectory associated therewith based on observed motion of the vehicle over time. In various examples, determining trajectories associated with objects 108 independent of the map data and/or map elements may improve the safe operation of the vehicle where there are limited (or no) lane markings, as is the case with jaywalkers, cars pulling into and out of a perpendicular parking space, and the like. In such examples, the techniques described herein enhance safety for the vehicle and objects 108 operating in the environment 100.

In some examples, the machine learning model may determine a first object trajectory associated with object 108(1) and a second object trajectory associated with object 108(2) based on observed movement of the objects 108(1) and 108(2) over time (e.g., from time $T_{-N}$ to $T_0$). In various examples, the object trajectories may be transformed into respective body frames of the objects 108(1) and 108(2). In such examples, the variance of the object trajectories may be reduced. In some examples, the object trajectories may be reflected about respective body y-axes associated with the objects 108(1) and 108(2). In such examples, the variance of the object trajectories may be further reduced. In various examples, the trajectory templates 140(1) and 142(2) may be derived based on cluster assignments (e.g., assignment of data points to clusters). In some examples, the trajectory templates 140(1) and 142(2) may be determined based on less than a threshold change to a centroid of data points between iterations of applying the clustering algorithm.

In various examples, the machine learning model may determine the trajectory templates 140(1) and 142(2) based on predicted locations associated with the respective objects 108(1) and 108(2) at the end of a prediction horizon (e.g., 2 seconds, 8 seconds, etc. in the future). In some examples, the machine learning model may be configured to generate a heat map representative of predicted locations and/or probabilities associated therewith. In at least some examples, such predicted locations may comprise those locations associated with the end of the time horizon and/or any other time period specified/provided. In such examples, broad heatmaps (or output probabilities) associated with coarse template trajectories may, nonetheless, be consumer by a planner system for planning a trajectory of the vehicle through the environment. In various examples, the machine learning model may be configured to determine the predicted locations based on the determined trajectories associated with the objects 108(1) and 108(2) at time T=0. In various examples, the predicted locations may be associated with bins based on a grid. In some examples, the machine learning model may perform a classification problem to determine a probability distribution of the different trajectory templates 140 and 142. In any example described herein, the output of such a template trajectory model may comprise a distribution over all possible templates. As a non-limiting example, the final layer of a network which outputs the templates may comprise a softmax function in which a probability for each template is specified. As such, various objects may have relatively high probabilities of one or more templates (e.g., a vehicle approaching an intersection in the left lane may have equal templated trajectories of proceeding through and making a turn).

In some examples, different trajectory templates 140 and 142 may be associated with separate bins of the grid. In such examples, the grid may include a sufficient resolution such that the different trajectory templates 140 and 142 are each associated with different bins. In various examples, one or more unsupervised learning algorithms (e.g., clustering algorithms) may be applied to the bins to determine the trajectory templates 140(1) and 142(2).

In various examples, the machine learned model may be trained to determine the predicted trajectory 146 associated with the object 108(1) and the predicted trajectory 148 associated with the object 108(2). The predicted trajectories 146 and 148 may represent a precise trajectory of future motion of the respective objects 108(1) and 108(2). In some examples, the future motion may be represented as one or more future positions of the object at one or more times in the future. In some examples, the predicted trajectories 146 and 148 may be based on the trajectory templates 140(1) and 142(2), respectively.

In various examples, the predicted trajectories 146 and 148 may be determined based on heat maps output by the machine learned model, such as utilizing the techniques described in the U.S. Patent Applications incorporated by reference above. In such examples, the heat map may be analyzed to determine a highest probability associated with a cell of the heat map to determine a predicted trajectory 146 or 148. For example, the predicted trajectories 146 and 148 may be determined utilizing the heat maps representative of the predicted locations and/or probabilities associated therewith of the objects 108 at the end of the prediction horizon.

In various examples, the machine learned model may determine the predicted trajectories 146 and 148 utilizing regression algorithms based on historical data (e.g., locations associated with the objects 108(1) and 108(2) at times prior to time T=0. In some examples, the machine learned model may perform individual object regressions associated with each of the objects 108(1) and 108(2). In such examples, the predicted trajectories 146 and 148 may be determined based on separate regression analyses.

In various examples, the machine learned model may be configured to determine a feature vector associated with each object 108(1) and 108(2) based on joint histories associated therewith (e.g., based on the multi-channel image(s)). In some examples, the individual object regressions may be performed on the feature vector, such as by concatenating the respective feature vectors and trajectory templates 140(1) and 142(2). In such examples, the predicted trajectories 146 and 148 may be based on a concatenation of a feature vector and a trajectory template 140(1) or 142(2) associated with an object 108(1) or 108(2).

Figure 2A:
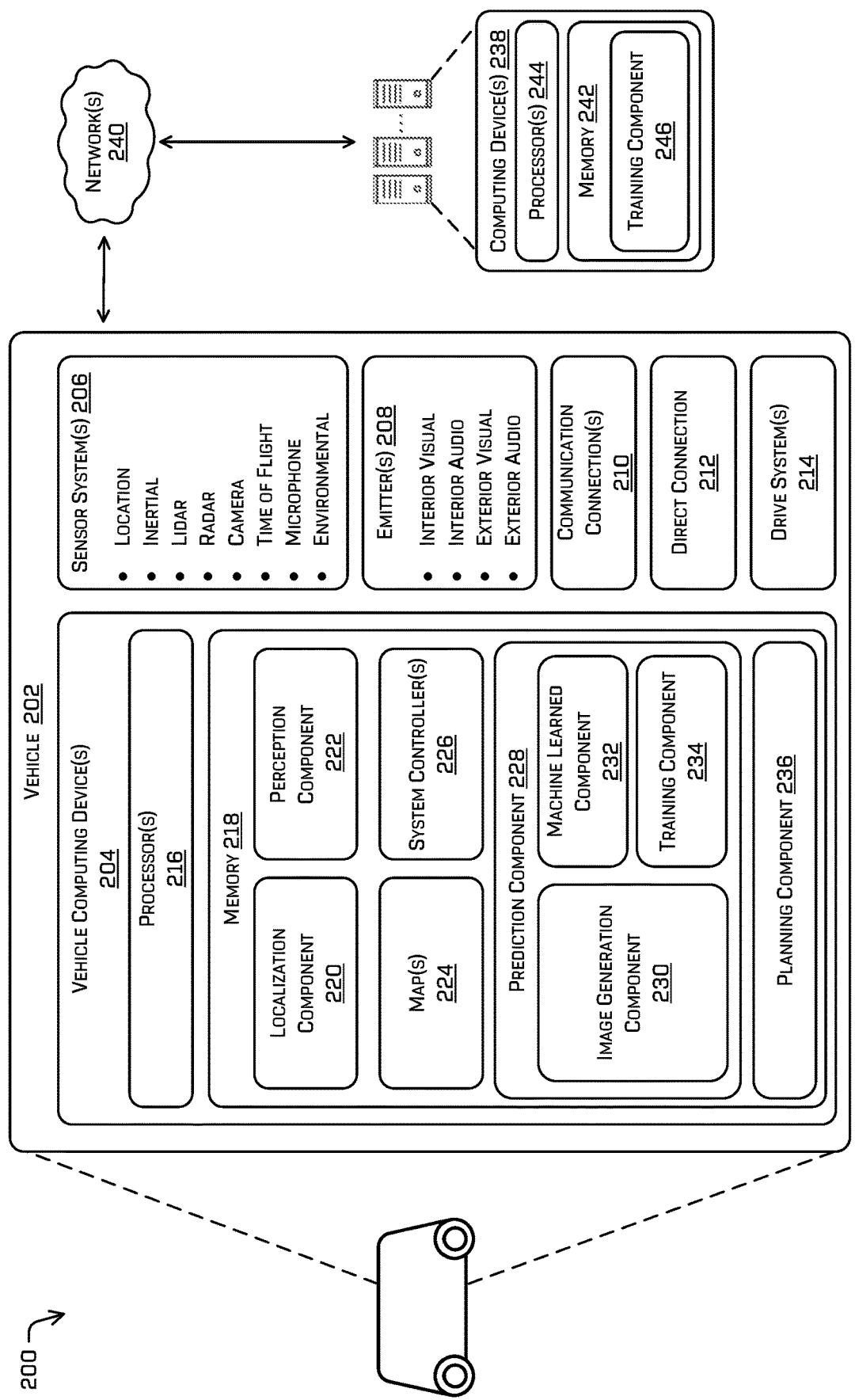
FIG. 2A depicts a block diagram of an example system for implementing the techniques described herein.

FIG. 2A depicts a block diagram of an example system 200 for implementing the techniques described herein. In at least one example, the system 200 may include a vehicle 202, such as vehicle 106.

The vehicle 202 may include one or more vehicle computing devices 204 (also referred to as a vehicle computing device 204 or vehicle computing device(s) 204), one or more sensor systems 206, one or more emitters 208, one or more communication connections 210, at least one direct connection 212, and one or more drive systems 214.

The vehicle computing device 204 may include one or more processors 216 and memory 218 communicatively coupled with the one or more processors 216. In the illustrated example, the vehicle 202 is an autonomous vehicle; however, the vehicle 202 could be any other type of vehicle. In the illustrated example, the memory 218 of the vehicle computing device 204 stores a localization component 220, a perception component 222, one or more maps 224, one or more system controllers 226, a prediction component 228 comprising an image generation component 230, a machine learned component 232, and a training component 234, and a planning component 236. Though depicted in FIG. 2A as residing in memory 218 for illustrative purposes, it is contemplated that the localization component 220, the perception component 222, the one or more maps 224, the one or more system controllers 226, the prediction component 228, the image generation component 230, the machine learned component 232, training component 234, and the planning component 236 may additionally, or alternatively, be accessible to the vehicle 202 (e.g., stored remotely, such as on computing device(s) 238).

In at least one example, the localization component 220 may include functionality to receive data from the sensor system(s) 206 to determine a position and/or orientation of the vehicle 202 (e.g., one or more of an x-, y-, z-position, roll, pitch, or yaw). For example, the localization component 220 can include and/or request/receive a map of an environment and can continuously determine a location and/or orientation of the autonomous vehicle within the map. In some instances, the localization component 220 can utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 220 may provide data to various components of the vehicle 202 to determine an initial position of an autonomous vehicle for generating a trajectory and/or for generating or receiving map data, as discussed herein.

In some instances, the perception component 222 may include functionality to perform object detection, segmentation, and/or classification. In some examples, the perception component 222 may provide processed sensor data that indicates a presence of an entity that is proximate to the vehicle 202 and/or a classification of the entity as an entity type (e.g., car, pedestrian, cyclist, building, tree, road surface, curb, sidewalk, unknown, etc.). In additional or alternative examples, the perception component 222 may provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

The memory 218 may further include one or more maps 224 that may be used by the vehicle 202 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 224 can include at least one map (e.g., images and/or a mesh). In some examples, the vehicle 202 may be controlled based at least in part on the map(s) 224. That is, the map(s) 224 may be used in connection with the localization component 220, the perception component 222, the prediction component 228, and/or the planning component 236 to determine a location of the vehicle 202, identify objects in an environment, generate prediction probabilit(ies) associated with objects and/or the vehicle 202, and/or generate routes and/or trajectories to navigate within an environment.

In some examples, the one or more maps 224 may be stored on a remote computing device(s) (such as the computing device(s) 238) accessible via network(s) 240. In some examples, multiple maps 224 may be stored based on, for example, a characteristic (e.g., type of entity, time of day, day of week, season of the year, etc.). Storing multiple maps 224 may have similar memory requirements, but increase the speed at which data in a map may be accessed.

In at least one example, the vehicle computing device 204 may include one or more system controllers 226, which may be configured to control steering, propulsion, braking, safety, emitters, communication, and other systems of the vehicle 202. These system controller(s) 226 may communicate with and/or control corresponding systems of the drive system(s) 214 and/or other components of the vehicle 202.

In general, the prediction component 228 may generate predicted trajectories of objects in an environment. For example, the prediction component 228 can generate one or more predicted trajectories for vehicles, pedestrians, bicyclists, and the like within a threshold distance from the vehicle 202. In some examples, the prediction component 228 may be configured to generate a trajectory template and a predicted trajectory for the object based on observed and predicted behavior, as discussed herein.

In some examples, the image generation component 230 may include functionality to generate images representing a top-down view of a scene. Examples of such images generated by the image generation component 230 are shown in FIG. 1 as the images 118, 120, and 122.

In some examples, the image generation component 230 may generate an image representing an area around the vehicle 202. In some examples, the area can be based at least in part on an area visible to sensors (e.g., a sensor range), a receding horizon, an area associated with an action (e.g., traversing through an intersection), and the like. In at least one example, the image may represent a 100 meter×100 meter area around the vehicle 202, although any area is contemplated. The image generation component 230 may receive data about objects in the environment from the perception component 222 and may receive data about the environment itself from the localization component 220, the perception component 222, and the one or more maps 224. The image generation component 230 may generate a top-down view of the environment including objects in the environment (e.g., represented by a bounding box, as discussed herein), semantic information about the object (e.g., a classification type), movement information (e.g., velocity information, acceleration information, etc.), and the like. The image generation component 230 may further generate image elements (e.g., symbols or other representations) in the image representing the various attributes of the object(s) and the environment, including but not limited to: one or more velocity vectors, one or more acceleration vectors, lighting indicators (e.g., braking lights of the object, turn signal lights of the object, etc., represented as respective indicator status), traffic light information (e.g., status of a traffic light), lane information (e.g., whether the lane is a left turn only lane, right turn only lane, etc.), and the like.

In some examples, the image generation component 230 may generate one or more images comprising semantic information of the environment, as discussed in detail herein. The image(s) generated by the image generation component 230 may represent prior information about the state of the environment and objects in the environment that may be used to generate trajectory templates and/or predicted trajectories, as discussed herein.

In any of the examples discussed herein, the image generation component 230 may generate an image having multiple channels, wherein each channel is representative of some information (semantic or otherwise).

In some examples, the machine learned component 232 (also referred to as a machine learned model component 232) may include functionality to receive the image(s) generated by the image generation component 230 and to generate one or more trajectory templates and/or predicted trajectories, as discussed herein.

In some instances, the machine learned component 232 may include one or more machine learning models trained to output the one or more trajectory templates and/or predicted trajectories based on top-down images input into the model. In some examples, the machine learned component 232 trajectory templates and/or predicted trajectories include a CNN, which may or may not include one or more RNN layers, for example, LSTM layers.

In some examples, trajectory template output by the machine learned component 232 may represent a classification of intent of future movement (e.g., predicted direction of future travel, class of motion, etc.) of the object. The classification of intent may include a rough estimate of future motion of the object, such as whether the object will continue forward, stop, turn left or right, etc. In some examples, the trajectory template may be determined independent of map data provided by the one or more maps 224. In various examples, the predicted trajectory output by the machine learned component 232 may represent a trajectory of future motion of the object, such as that represented by one or more future positions of the object.

In some examples, the predicted trajectory may be determined based on a heat map generated by the machine learned component 232. In such examples, the prediction component 228 may be configured to determine the predicted trajectory based on the heat map output by the machine learned component 232. In some examples, a heat map may represent a discretized region of the environment proximate to the autonomous vehicle. In some examples, an area represented by a heat map may correspond to the area represented by the images input to the machine learned component 232. Of course, the heat map can represent any size of region and can represent any number of discrete portions of the region. In some cases, a portion of the heat map can be referred to as a cell of the heat map. Each cell may comprise a prediction probability representing a probability that the object will be at the corresponding location in the environment at the time corresponding to the heat map. In some instances, the machine learning model may output a plurality of heat maps, wherein a heat map of the plurality of heat maps may represent probability predictions associated with the object at a particular time in the future (e.g., 0.5 second, 1 second, 3 seconds, 5 seconds, 10 seconds, etc.).

In various examples, the training component 234 may be configured to train the machine learned component 232 during operation of the vehicle 202 (e.g., when the vehicle is online). In some examples, the training component 234 may determine a ground truth for training based on an action actually performed by an object. The ground truth may include the actual trajectory that the object traversed through the environment. In some examples, the training component 234 may compare the ground truth (e.g., action performed) against the trajectory template and/or predicted trajectory. Based on the comparison, the training component 234 may be configured to train the machine learned component 232 to output accurate trajectory templates and/or predicted trajectories, which may be provided to the planning component 236 for controlling the vehicle 202.

In general, the planning component 236 may determine a path for the vehicle 202 to follow to traverse through an environment. The path may include a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. In some examples, the planning component 236 may be configured to generate an instruction for guiding the autonomous vehicle 202 along at least a portion of the route from the first location to the second location.

In at least one example, the planning component 236 may determine how to guide the autonomous vehicle from a first waypoint in the sequence of waypoints to a second waypoint in the sequence of waypoints. In some examples, the instruction may include a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 202 to navigate. In various examples, the trajectory(ies) for the vehicle to traverse through the environment may be determined based on the trajectory templates and/or predicted trajectories determined by the prediction component 228.

In some examples, the machine learned component 232 may provide the trajectory templates and/or predicted trajectories directly to the planning component 236, which in turn can select or determine an action for the vehicle 202 to perform and/or can generate a trajectory for the vehicle 202 to follow.

In some instances, aspects of some or all of the components discussed herein can include any models, algorithms, and/or machine learning algorithms. For example, in some instances, the components in the memory 218 (and the memory 242, discussed below) can be implemented as a neural network.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

In at least one example, the sensor system(s) 206 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), time of flight sensors, microphones, wheel encoders, environment sensors (e.g., temperature sensors, humidity sensors, light sensors, pressure sensors, etc.), etc. The sensor system(s) 206 may include multiple instances of each of these or other types of sensors. For instance, the lidar sensors may include individual lidar sensors located at the corners, front, back, sides, and/or top of the vehicle 202. As another example, the camera sensors may include multiple cameras disposed at various locations about the exterior and/or interior of the vehicle 202. The sensor system(s) 206 may provide input to the vehicle computing device 204. Additionally or alternatively, the sensor system(s) 206 may send sensor data, via the one or more networks 240, to the one or more computing device(s) 238 at a particular frequency, after a lapse of a predetermined period of time, in near real-time, etc.

The vehicle 202 may also include one or more emitters 208 for emitting light and/or sound, as described above. The emitters 208 in this example include interior audio and visual emitters to communicate with passengers of the vehicle 202. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 208 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 202 may also include one or more communication connection(s) 210 that enable communication between the vehicle 202 and one or more other local or remote computing device(s). For instance, the communication connection(s) 210 may facilitate communication with other local computing device(s) on the vehicle 202 and/or the drive system(s) 214. Also, the communication connection(s) 210 may allow the vehicle 202 to communicate with other nearby computing device(s) (e.g., other nearby vehicles, traffic signals, etc.). The communications connection(s) 210 also enable the vehicle 202 to communicate with a remote teleoperations computing device or other remote services.

The communications connection(s) 210 may include physical and/or logical interfaces for connecting the vehicle computing device 204 to another computing device or a network, such as network(s) 240. For example, the communications connection(s) 210 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 202 may include one or more drive systems 214. In some examples, the vehicle 202 may include a single drive system 214. In at least one example, if the vehicle 202 includes multiple drive systems 214, individual drive systems 214 may be positioned on opposite ends of the vehicle 202 (e.g., the front and the rear, etc.). In at least one example, the drive system(s) 214 may include one or more sensor systems to detect conditions of the drive system(s) 214 and/or the surroundings of the vehicle 202. By way of example and not limitation, the sensor system(s) may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 214. In some cases, the sensor system(s) on the drive system(s) 214 may overlap or supplement corresponding systems of the vehicle 202 (e.g., sensor system(s) 206).

The drive system(s) 214 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 214 may include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 214. Furthermore, the drive system(s) 214 also include one or more communication connection(s) that enable communication by the respective drive system with one or more other local or remote computing device(s).

In at least one example, the direct connection 212 may provide a physical interface to couple the one or more drive system(s) 214 with the body of the vehicle 202. For example, the direct connection 212 can allow the transfer of energy, fluids, air, data, etc. between the drive system(s) 214 and the vehicle. In some instances, the direct connection 212 may further releasably secure the drive system(s) 214 to the body of the vehicle 202.

In some examples, the vehicle 202 may send sensor data to one or more computing device(s) 238 via the network(s) 240. In some examples, the vehicle 202 may send raw sensor data to the computing device(s) 238. In other examples, the vehicle 202 may send processed sensor data and/or representations of sensor data to the computing device(s) 238. In some examples, the vehicle 202 may send sensor data to the computing device(s) 238 at a particular frequency, after a lapse of a predetermined period of time, in near real-time, etc. In some cases, the vehicle 202 may send sensor data (raw or processed) to the computing device(s) 238 as one or more log files.

The computing device(s) 238 may include processor(s) 244 and a memory 242 storing a training component 246. In some examples, the training component 246 may include functionality to train a machine learning model to output one or more trajectory templates and/or predicted trajectories. The machine learning model may include a first network or first set of networks configured to output trajectory templates and/or heat maps representative of predicted object locations at a time in the future (e.g., end of a prediction horizon), a second network or second set of networks configured to output predicted trajectories. In some examples, the second set of networks may include networks configured to determine predicted trajectories based on classifications associated with the trajectory templates. In some examples, the first network or first set of networks may be trained utilizing one or more clustering algorithms and the second network or second set of networks may be trained utilizing one or more regression algorithms.

In some examples, the training component 246 may include functionality to train a machine learning model to output one or more heat maps including prediction probabilities. For example, the training component 246 may receive a set of images representing a top-down view of an environment. In some cases, the set of images may represent one or more objects traversing through an environment for a period of time, such as 5 seconds, 7 seconds, 10 seconds, 20 seconds, and the like. At least a portion of the set of images may be used as an input to train the machine learning model, and at least a portion of the set of images may be used as ground truth information for training the machine learning model. As a non-limiting example, a first set (e.g., 3, 4, 5, or more) of a sequence of images may be input into the machine learned model. In some instances, a path and/or route (e.g., trajectory) of the vehicle 202 may be input for training as well (e.g., as may be encoded as a channel of the multi-channel image). A second set of images (or trajectory information associated therefrom—e.g., by extracting positions and/or velocities from the images) in the sequence of images immediately preceding the first set may then be used as ground truth for training the model. Thus, by providing images of recorded trajectories where objects traverse an environment, the prediction components 228 may be trained to output trajectory templates, predicted trajectories, and/or heat maps including prediction probabilities, as discussed herein.

In some examples, the training component 246 may include training data that has been generated by a simulator. For example, simulated training data can represent examples where a vehicle collides with an object in an environment or nearly collides with an object in an environment, to provide additional training examples.

Additional details of the training component 246 are discussed below in connection with FIG. 2B, as well as throughout this disclosure.

The processor(s) 216 of the vehicle 202 and the processor(s) 244 of the computing device(s) 238 may be any suitable processor capable of executing instructions to process data and perform operations as described herein. By way of example and not limitation, the processor(s) 216 and 244 may comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 218 and 242 are examples of non-transitory computer-readable media. The memory 218 and 242 may store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, the memory 218 and 242 may include at least a working memory and a storage memory. For example, the working memory may be a high-speed memory of limited capacity (e.g., cache memory) that is used for storing data to be operated on by the processor(s) 216 and 244. In some instances, the memory 218 and 242 may include a storage memory that may be a lower-speed memory of relatively large capacity that is used for long-term storage of data. In some cases, the processor(s) 216 and 244 may not operate directly on data that is stored in the storage memory, and data may need to be loaded into a working memory for performing operations based on the data, as discussed herein.

It should be noted that while FIG. 2 is illustrated as a distributed system, in alternative examples, components of the vehicle 202 may be associated with the computing device(s) 238 and/or components of the computing device(s) 238 may be associated with the vehicle 202. That is, the vehicle 202 may perform one or more of the functions associated with the computing device(s) 238, and vice versa.

Figure 2B:
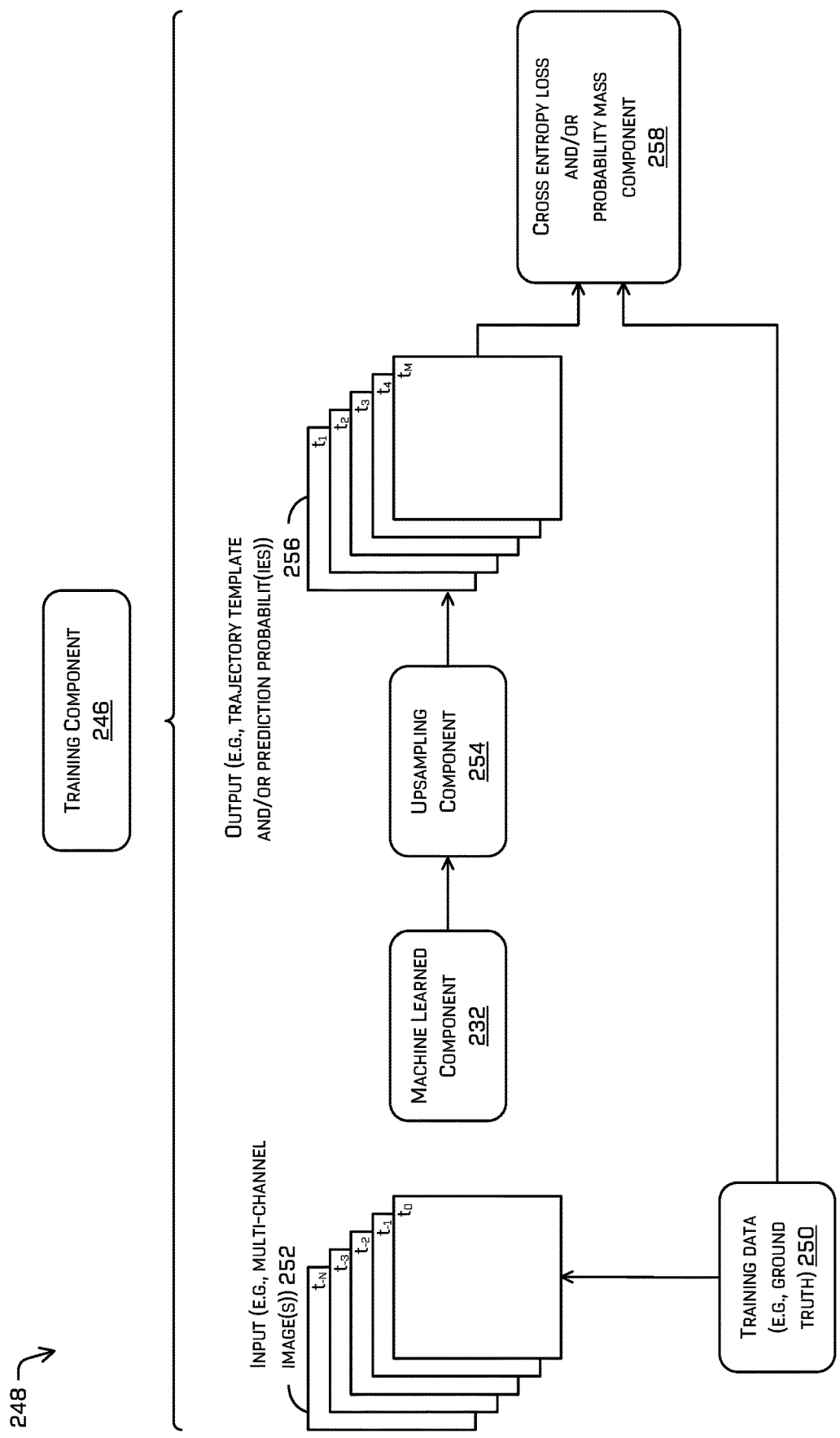
FIG. 2B depicts a block diagram of an example training component for training a machine learned model to implement the techniques described herein.

FIG. 2B depicts a block diagram 248 of an example training component for training a machine learned model to implement the techniques described herein.

In some examples, training data 250 may comprise data captured by a vehicle as it traverses through an environment. In various examples, the training data 250 may include a type of object (e.g., pedestrian, vehicle, bicyclist, etc.) associated with each object in the training data. In some examples, the training data 250 may include information corresponding to one or more scenarios (e.g., highway, junction (e.g., road split, four-way intersection, etc.) associated with the environment. In such examples, the machine learned component 232 may be trained to determine trajectory templates and predicted trajectories based on data associated with the different types of objects and/or different scenarios. In some examples, an input 252 may be based at least in part on the training data 250.

The input 252 comprising one or more multi-channel images may be input to the machine learned component 232. As discussed above, the machine learned component 232 may utilize one or more unsupervised learning algorithms, such as clustering algorithms, to determine trajectory templates associated with objects.

In some examples, the machine learned component 232 may comprise a ResNet architecture. In some examples, the machine learned component 232 may comprise the ResNet architecture as a base backbone.

In some examples, an output feature map may be passed through a 1×1 convolution to obtain the final channel dimension, which can be bilinearly (or otherwise) upsampled (e.g., via an upsampling component 254) to match an input resolution, which is represented as an output 256 (e.g., trajectory templates and predicted trajectories)).

In some examples, the output logits from the machine learned component 232 may be compared against training data 250 (e.g., ground truth representing an occupancy map) using a sigmoid cross entropy loss.

A cross entropy loss and/or probability mass component 258 may include functionality to compare the output logits against the training data 250. A resulting loss matrix may then be balanced across occupied and unoccupied pixels in the training data 250 according to the following function:

$$L_{balance} = 0.5 \times \sum_{i=0}^{N} \left( \frac{1_{occupied_i} L_i}{n_{occupied_i}} + \frac{1_{unoccupied_i} L_i}{n_{unoccupied_i}} \right) \quad (1)$$

where $L_i$ is a loss matrix obtained from sigmoid cross entropy loss at an i-th step in the future, N are the number of future steps being predicted. The terms $1_{occupied}$ and $1_{unoccupied}$ are indicator matrices representing the occupancy and unoccupancy map of objects in future, and the terms $n_{occupied}$ and $n_{unoccupied}$ represents the number of occupied and unoccupied cells in the future. Balancing across occupancy ensures that an equal number (or roughly equal) of occupied and unoccupied gradients pass through back propagation and that the prediction component 228 does not bias towards predicting all cells as occupied or all cells as unoccupied.

The dense segmentation cost specified in equation (1) above may not conserve the total number of entities in a scene. In some examples, the cross entropy loss and/or probability mass component 258 may include an additional cost to minimize differences between a total probability mass (e.g., a sum of probabilities associated with a heat map, total probability distribution associated with predicted future locations) predicted by the prediction component 228 in a scene and the actual number of occupied cells as:

$$L_{prob} = 0.5 \times \sum_{k=0}^{N} \left( n_{occupied_i} - \sum_{j} \phi_i[j] \right) \quad (2)$$

where $\phi_i$, represents the occupancy map at step i in future. By adding the probability mass component, the prediction component 228 may distribute the total probability mass among available cells without creating additional probability mass. For example, if the autonomous vehicle has two possible modes, then the network may distribute the probability of occupancy among the two modes and not add any additional occupancy probability.

Further, constraining or otherwise managing the mass of a scene limits an availability of the network to add additional objects into an environment, which may simplify processing.

Figure 3:
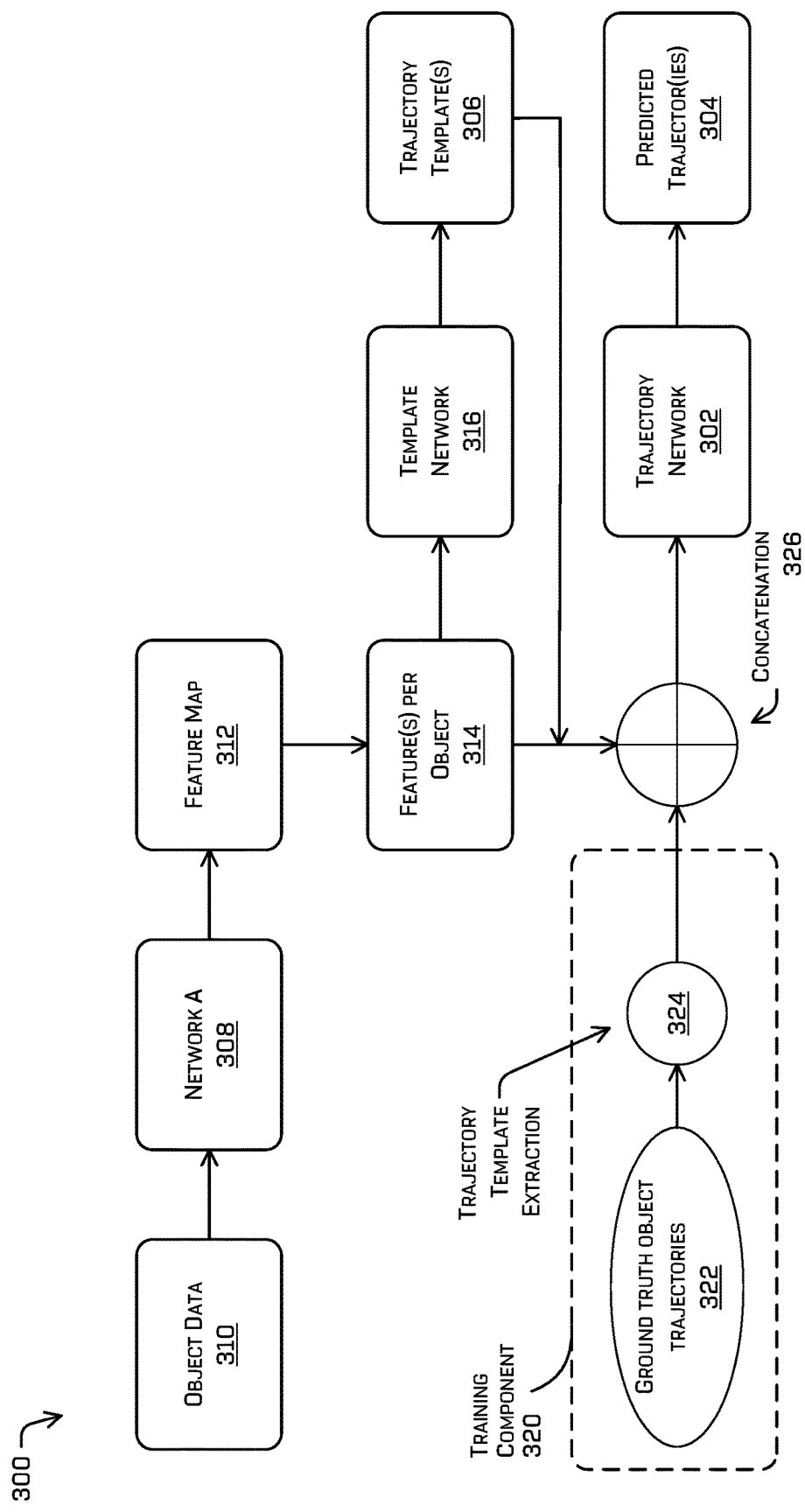
FIG. 3 depicts a block diagram of an example prediction system including a network configured to determine predicted trajectories associated with determined trajectory templates associated with objects, in accordance with examples of the disclosure.

FIG. 3 illustrates a prediction system 300 including a trajectory network 302 configured to determine predicted trajectories 304 associated with determined trajectory templates 306 associated with objects, in accordance with examples of the disclosure.

As illustrated a first network 308 (illustrated network A) of the prediction system 300 may receive one or more images 310 representing an environment of a vehicle. The images 310 may include multi-channel image(s), as described herein. The image(s) may include, but are not limited to, object data (e.g., bounding boxes representing objects detected in the environment, velocity information associated with the objects (x-direction and a y-direction), acceleration information associated with the objects (x-direction and a y-direction), a type of object (e.g., vehicle, pedestrian, bicyclist, scooter, skateboard, etc.), blinker status associated with the bounding box (e.g., left-turn, right-turn, braking, reverse, hazards, no lights, etc.), etc.), road network information (e.g., semantic labels indicating lanes, crosswalks, stop signs, intersections, traffic lights, and the like), one or more scenarios in the environment (e.g., highway, junction (e.g., road split, four-way intersection, etc.), traffic light status (e.g., red light, yellow light, green light, etc.), vehicle data (e.g., route, trajectory, etc.), and the like. In such an image, semantic information about the object and the environment may be encoded in one or more channels, as discussed in detail herein.

The first network 308 may be configured to receive the image(s) 310 and generate a global feature map 312 representing the environment. In various examples, the first network 308 may include a neural network. In at least one example, the first network 308 may include a CNN, though other types of networks are contemplated herein. In various examples, the feature map 312 may represent joint histories of the detected objects in the environment. The joint history may include dependent relationships (e.g., reactions of one object to another object) between objects. The joint history may include independent objects (e.g., objects operating irrespective of other objects).

In various examples, the prediction system 300 may be configured to determine one or more features per object 314 based on the feature map 312. In some examples, the feature(s) per object 314 may represent a feature vector associated with each detected object. In various examples, the feature(s) per object 314 may be based on spatial locations associated with each object represented in the feature map 312.

In various examples, the feature(s) per object 314 may be input into a template network 316. In such examples, the template network 316 may be configured to output a trajectory template 306 associated with each detected object (e.g., one or more trajectory templates 306) based in part on the input feature(s) per object 314. In various examples, the template network 316 may include a neural network. In some examples, the template network 316 may include a dense neural network. In at least one example, the template network 316 may be trained utilizing unsupervised learning algorithms, though any type of machine learning may be used consistent with this disclosure.

Figure 4:
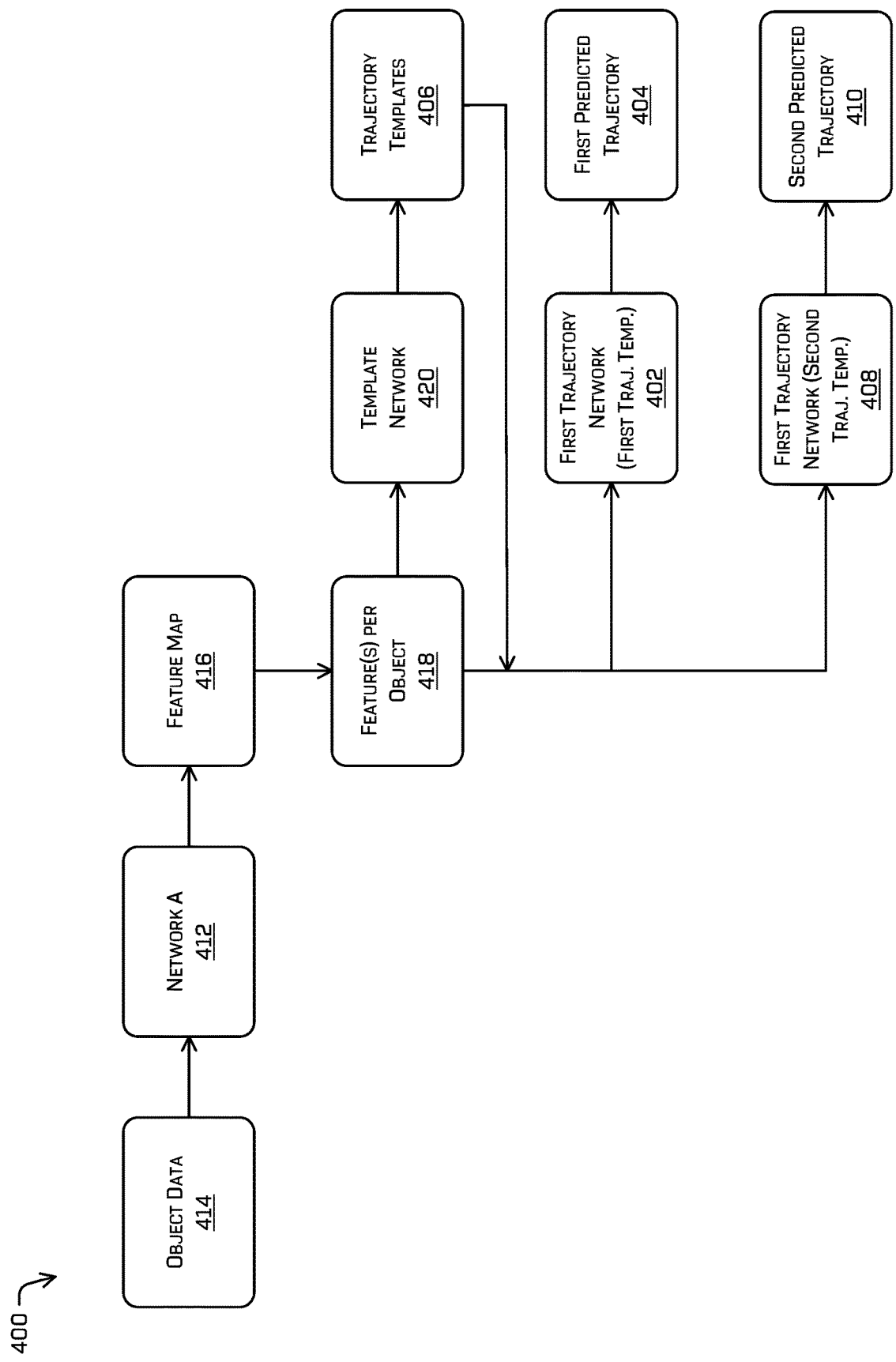
FIG. 4 is a block diagram of an example prediction system including networks configured to determine a predicted trajectory based on a trajectory template, in accordance with examples of the disclosure.

In various examples, the trajectory template(s) 306 and feature(s) per object 314 may be combined (e.g., concatenated) and input into a trajectory network 302. The trajectory network 302 may be configured to output a predicted trajectory 304 associated with each detected object. In various examples, the trajectory network 302 may include a neural network. In some examples, the trajectory network 302 may include a dense neural network. The trajectory network 302 may be trained utilizing unsupervised and/or supervised learning algorithms, though any type of machine learning may be used consistent with this disclosure. In the illustrative example, a single trajectory network 302 may be configured to determine predicted trajectories 304 for each of the output trajectory template(s) 306. In other examples, as illustrated in FIG. 4, the prediction system 300 may include two or more trajectory networks 302, each configured to determine predicted trajectories 304 for a particular trajectory template 306.

In various examples, the prediction system may include a training component 320, such as training component 234 configured to train at least one network of the prediction system based on observed data (e.g., ground truth object trajectories 322). In various examples, the training component 320 may extract trajectory templates at 324 from the ground truth object trajectories 322. In some examples, the ground truth object trajectories 322 may include trajectories observed by a perception system (e.g., actual object trajectories) during vehicle operation (e.g., vehicle operating in the environment). Such trajectory templates may be determined, for example, based on, for example, broadly categorizing motion into several types of motion (remain motionless, change lanes, stay in lane, turn left, turn right, etc.).

In some examples the trajectory templates extracted (at 324) from the ground truth object trajectories 322 may be concatenated at 326 and the concatenated data may be used to train the trajectory network 302 and/or the template network 316.

In various examples, the template network 316 and the trajectory network 302 may be jointly trained. In such examples, the trajectory template(s) 306 may reinforce the predicted trajectories 304 in training and vice versa.

FIG. 4 illustrates an example prediction system 400 including a first trajectory network 402 configured to determine a first predicted trajectory 404 based on a first trajectory template of trajectory templates 406 and a second trajectory network 408 configured to determine a second predicted trajectory 410 based on a second trajectory template of trajectory templates 406, in accordance with examples of the disclosure.

As illustrated a first network 412 (illustrated network A) of the prediction system 400 may receive one or more images 414 representing an environment of a vehicle. The images 414 may include multi-channel image(s), as described herein. The image(s) may include, but are not limited to, object data (e.g., bounding boxes representing objects detected in the environment, velocity information associated with the objects (x-direction and a y-direction), acceleration information associated with the objects (x-direction and a y-direction), a type of object (e.g., vehicle, pedestrian, bicyclist, scooter, skateboard, etc.), blinker status associated with the bounding box (e.g., left-turn, right-turn, braking, reverse, hazards, no lights, etc.), etc.), road network information (e.g., semantic labels indicating lanes, crosswalks, stop signs, intersections, traffic lights, and the like), one or more scenarios in the environment (e.g., highway, junction (e.g., road split, four-way intersection, etc.), traffic light status (e.g., red light, yellow light, green light, etc.), vehicle data (e.g., route, trajectory, etc.), and the like. In such an image, semantic information about the object and the environment may be encoded in one or more channels, as discussed in detail herein.

The first network 412 may be configured to receive the image(s) 414 and generate a global feature map 416 representing the environment. In various examples, the first network 412 may include a neural network. In at least one example, the first network 412 may include a CNN, though other types of networks are contemplated herein. In various examples, the feature map 416 may represent joint histories of the detected objects in the environment. The joint history may include dependent relationships (e.g., reactions of one object to another object) between objects. In some examples, a joint history may be determined by a physical proximity of objects in an environment (e.g., a distance between a first object and a second object below a threshold), an angle between instantaneous trajectories below a threshold (e.g., indicative that the objects may be approaching one other), and the like. The joint history may include independent objects (e.g., objects operating irrespective of other objects).

In various examples, the prediction system 400 may be configured to determine one or more features per object 418 based on the feature map 416. In some examples, the feature(s) per object 418 may represent a feature vector associated with each detected object. In various examples, the feature(s) per object 418 may be based on spatial locations associated with each object represented in the feature map 416.

In various examples, the feature(s) per object 418 may be input into a template network 420. The template network 420 may be configured to output a trajectory template 406 associated with each detected object (e.g., one or more trajectory templates 406). In various examples, the template network 420 may include a neural network. In some examples, the template network 420 may include a dense neural network. In at least one example, the template network 420 may be trained utilizing unsupervised learning algorithms, though any type of machine learning may be used consistent with this disclosure.

In various examples, a first trajectory template of the trajectory template(s) 406 and feature(s) per object 418 associated with a first object corresponding to the first trajectory template may be input into the first trajectory network 402 to determine the first predicted trajectory 404 associated with the first object. In some examples, a second trajectory template of the trajectory template(s) 406 and feature(s) per object 418 associated with a second object corresponding to the second trajectory template may be input into the second trajectory network 408 to determine the second predicted trajectory 410 associated with the second object.

The trajectory networks 402 and 408 may be configured to output the predicted trajectories 404 and 410 associated with the first object and the second object. In some examples, the predicted trajectories 404 and 410 may be associated with the first object and the second object, respectively. In such examples, the first trajectory network 402 may output the first predicted trajectory 404 associated with the first object based on a trajectory template associated therewith and the second trajectory network 408 may output the second predicted trajectory 410 associated with the second object based on a trajectory template 406 associated therewith. In some examples, the first predicted trajectory 404 and the second predicted trajectory 410 may be associated with one of the first object or the second object, such as based on different trajectory templates 406 associated therewith. In such examples, the techniques described herein may further improve predictions associated with an object. For example, the first object may have associated therewith a first trajectory template (turning right) and a second trajectory template (turning left). The first predicted trajectory 404 may be based on the first trajectory template associated with the first object and the second predicted trajectory 410 may be based on the second trajectory template associated with the first object. In various examples, the trajectory networks 402 and 408 may include neural networks. In some examples, the trajectory networks 402 and 408 may include dense neural networks. The trajectory networks 402 and 408 may be trained utilizing unsupervised and/or supervised learning algorithms.

In various examples, the first trajectory network 402 may be associated with the first trajectory template and the second trajectory network 408 may be associated with a second (different) trajectory template. In such examples, the first trajectory network may be trained utilizing training data associated with the first trajectory template and the second trajectory network may be trained utilizing training data associated with the second trajectory template. In some examples the first trajectory network 402 may be associated with a first classification (e.g., classification of movement, class of motion, turning right, going straight, turning left, etc.) associated with the first trajectory template and the second trajectory network 408 may be associated with a second classification associated with the second trajectory template. For example, the first trajectory network may be trained to determine predicted trajectories associated with a trajectory template associated with a predicted general (e.g., coarse) movement to the right and the second trajectory network may be trained to determine predicted trajectories associated with a trajectory template associated with a predicted general movement to the left, though this is merely an example for illustrative purposes, and is not intended to be so limiting. In some examples, such as that illustrated in FIG. 3, a single network may be configured to determine predicted trajectories for one or more trajectory templates 406. In some examples, the single network may be configured to determine predicted trajectories for all trajectory templates output by the template network 420.

FIGS. 1, 2B, 5 and 6 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 5:
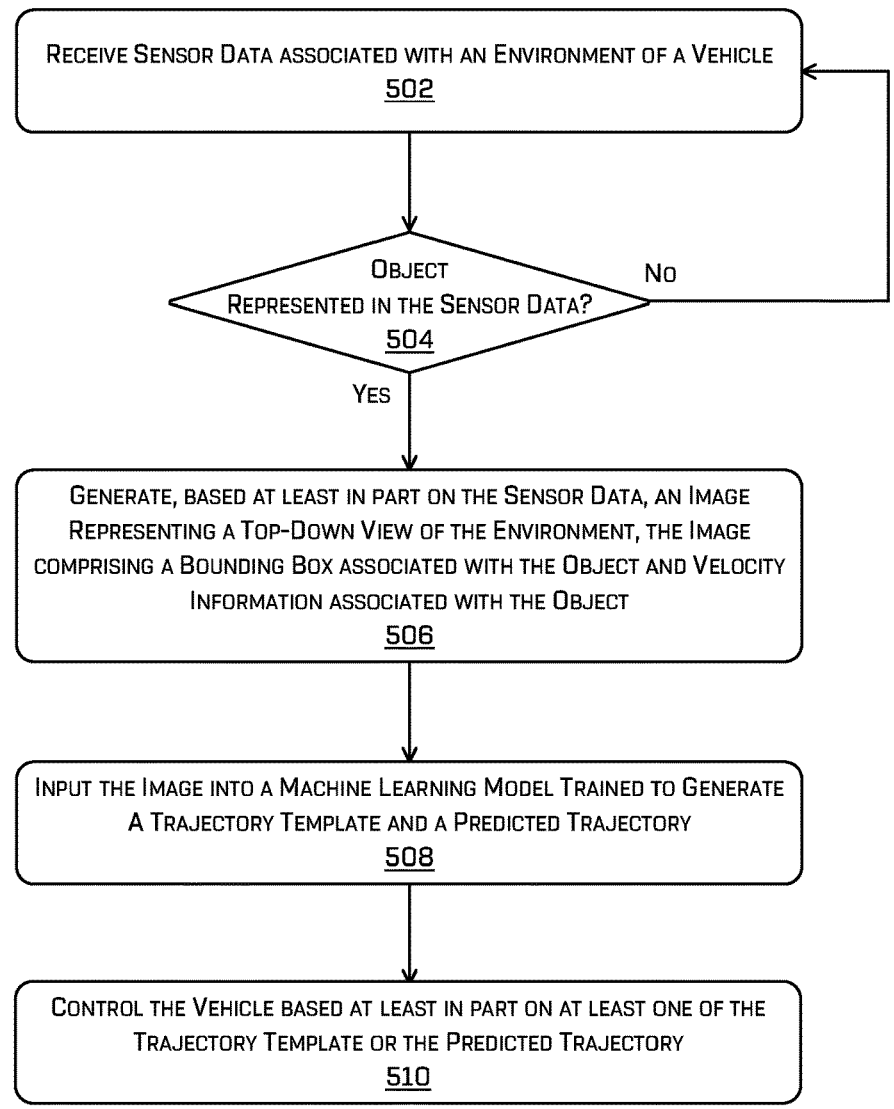
FIG. 5 depicts an example process for determining that an object is present in an environment of a vehicle, determining a trajectory template and a predicted trajectory associated with the object, and controlling the vehicle based in part on the predicted trajectory, in accordance with examples of the disclosure.

FIG. 5 depicts an example process 500 for determining that an object is present in an environment of a vehicle, determining a trajectory template and a predicted trajectory associated with the object, and controlling the vehicle based in part on the predicted trajectory, in accordance with examples of the disclosure. For example, some or all of the process 500 may be performed by one or more components in FIG. 2A, as described herein. For example, some or all of the process 500 may be performed by the vehicle computing device(s) 204 and/or the computing device(s) 238.

At operation 502, the process may include receiving sensor data associated with an environment. The sensor data may be captured by one or more sensors of a vehicle and/or one or more remote sensors. For example, the sensor data may include data captured by one or more of a lidar sensor, a radar sensor, an image sensor, a time of flight sensor, a sonar sensor, and the like. In some examples, the operation 502 may include capturing sensor data using a plurality of sensors and fusing or combining the sensor data into a detail and informative representation of the environment. For example, the sensor data may include but is not limited to bounding box information, velocity/acceleration information, classification, and the like. In some examples, additional data may be received (such as map data) which may encode additional data about the environment (location of crosswalks, lane boundaries, etc.).

At operation 504, the process may include determining whether an object is represented in the sensor data. For example, the operation 504 may include inputting at least a portion of the sensor data into a detector or providing the data to a detection or perception algorithm (e.g., the perception component 222) to identify one or more objects in the environment. Examples of objects include, but are not limited to, a vehicle, a pedestrian, a bicycle, a skateboard, a scooter, and the like. If no object is detected (e.g., "No" in the operation 504) the process may return to the operation 502 to captured additional sensor data.

Based on a determination that an object is detected (e.g., "Yes" in the operation 504, the process, at operation 506, may include generating, based at least in part on the sensor data, an image representing a top-down view of the environment, the image comprising a bounding box associated with the object and velocity information associated with the object. In some examples, the image may comprise acceleration information (instead of or in addition to the velocity information).

Additional information that can be included in the image may include, but is not limited to: a color of the bounding box representing a classification of the object associated with the bounding box, a velocity of the bounding box in an x-direction and a y-direction (where a velocity can be represented as a vector in one channel or in multiple channels, with the x-velocity and the y-velocity represented in different channels), an acceleration of the object in an x-direction and a y-direction (where an acceleration may be represented as a vector in one channel or in multiple channels, with the x-acceleration and the y-acceleration represented in different channels), a blinker status associated with the bounding box (e.g., left-turn, right-turn, braking, reverse, hazards, no lights, etc.), road network information (e.g., semantic labels indicating lanes, crosswalks, stop signs, intersections, traffic lights, and the like), traffic light status (e.g., red light, yellow light, green light, etc.), and the like. In such an image, semantic information about the object and the environment may be encoded in one or more channels as discussed in detail herein.

As discussed herein, the operation 506 can include generating a plurality of images representing behavior of the object in the environment over time.

At operation 508, the process may include inputting the image(s) into a machine learned model. Such a machine learned model may be trained to generate a trajectory template and a predicted trajectory associated with the object. In some examples, the machine learned model may be trained to generate a plurality of prediction probabilities (e.g., as a heat map). Additional details of the machine learned model, the trajectory template, the predicted trajectory, the heat map, and the prediction probabilities are discussed throughout the disclosure.

At operation 510, the process may include controlling the vehicle based at least in part on at least one of the trajectory template or the predicted trajectory. In some examples, controlling the vehicle may include controlling one or more of steering, braking, and/or acceleration of the autonomous vehicle to traverse through the environment. In various examples, operation 510 may include sending the trajectory template and/or the predicted trajectory to a planning component, such as planning component 236. In such examples, the planning component may determine one or more vehicle trajectories associated with vehicle control based at least in part on at least one of the trajectory template or the predicted trajectory associated with the object. In some examples, the vehicle trajectory(ies) based on at least one of the trajectory template or the predicted trajectory may represent a safer and/or smoother vehicle trajectory compared to a vehicle trajectory generated without the at least one of the trajectory template or the predicted trajectory, as the planning component 236 generating the trajectory may anticipate more closely the actions of entities proximate to the vehicle.

Figure 6:
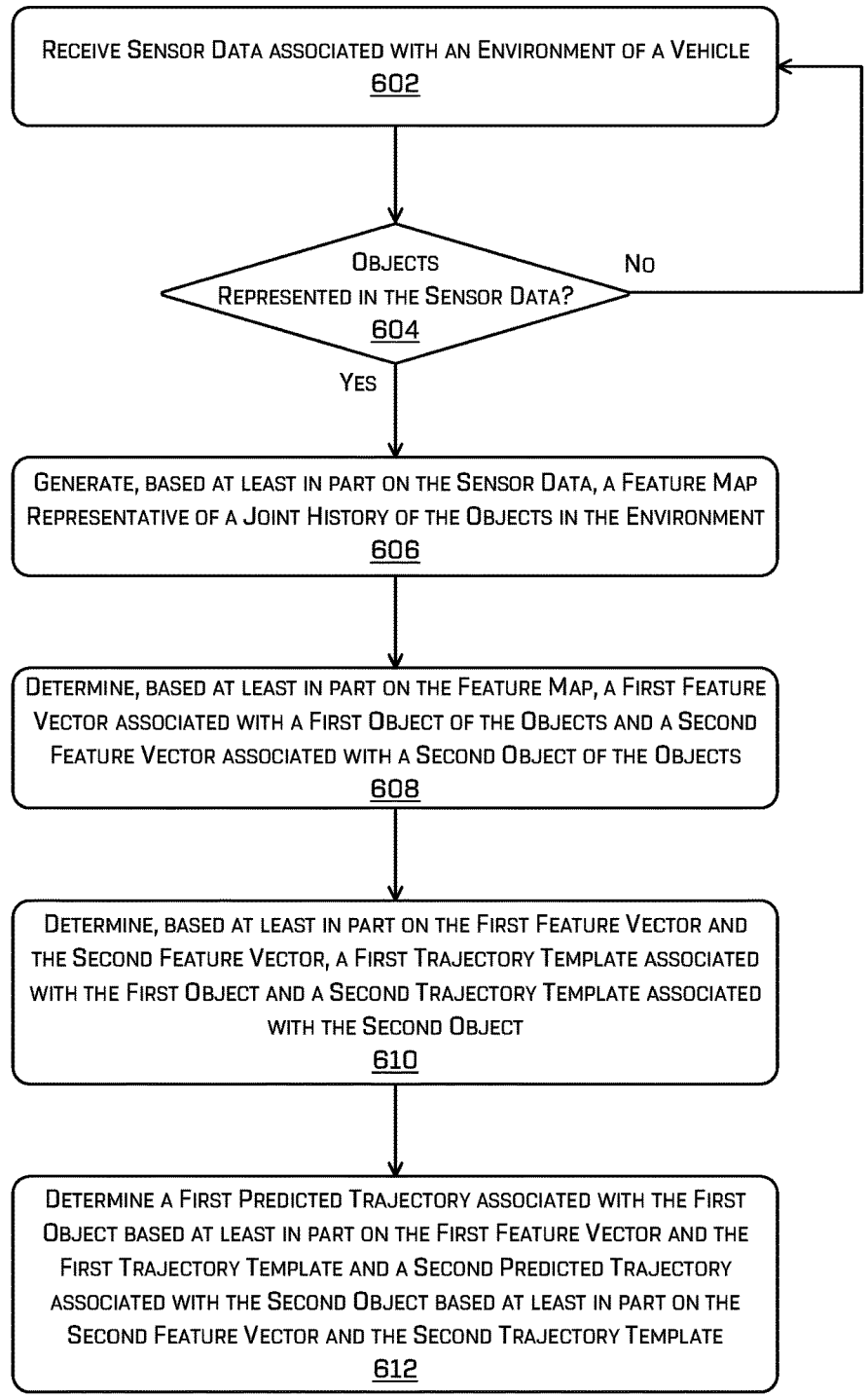
FIG. 6 depicts an example process for determining predicted trajectories associated with detected objects in an environment based on a joint history associated with the objects, in accordance with examples of the disclosure.

FIG. 6 depicts an example process 600 for determining predicted trajectories associated with detected objects in an environment based on a joint history associated with the objects, in accordance with examples of the disclosure. For example, some or all of the process 600 may be performed by one or more components in FIG. 2, as described herein. For example, some or all of the process 600 may be performed by the vehicle computing device(s) 204 and/or the computing device(s) 238.

At operation 602, the process may include receiving sensor data associated with an environment. The sensor data may be captured by one or more sensors of a vehicle and/or one or more remote sensors. For example, the sensor data may include data captured by one or more of a lidar sensor, a radar sensor, an image sensor, a time of flight sensor, a sonar sensor, and the like. In some examples, the operation 602 may include capturing sensor data using a plurality of sensors and fusing or combining the sensor data into a detail and informative representation of the environment. For example, the sensor data may include but is not limited to bounding box information, velocity/acceleration information, classification, and the like. In some examples, additional data may be received (such as map data) which may encode additional data about the environment (location of crosswalks, lane boundaries, etc.).

At operation 604, the process may include determining whether one or more objects are represented in the sensor data. For example, the operation 604 may include inputting at least a portion of the sensor data into a detector or providing the data to a detection or perception algorithm (e.g., the perception component 222) to identify the one or more objects in the environment. Examples of objects include, but are not limited to, a vehicle, a pedestrian, a bicycle, a skateboard, a scooter, and the like. If no object is detected (e.g., "No" in the operation 604) the process may return to the operation 602 to captured additional sensor data.

Based on a determination that an object is detected (e.g., "Yes" in the operation 604, the process, at operation 606, may include generating, based at least in part on the sensor data, a feature map representative of a joint history (e.g., combined history of individual movements and/or interactions between objects) of the objects in the environment. In various examples, the feature map may include a combination of a plurality of multi-channel images, as described herein. The joint history of the objects may include interactions between objects in the environment, such as an indication of a first object yielding to a second object, or the like.

At operation 608, the process may include determining, based at least in part on the feature map, a first feature vector associated with a first object of the objects and a second feature vector associated with a second object of the objects. The first feature vector and the second feature vector may represent motion associated with the first object and the second object, respectively. In various examples, the first feature vector may be based on a first spatial location associated with the first object and the second feature vector may be based on a second spatial location associated with the second object.

At operation 610, the process may include determining, based at least in part on the first feature vector and the second feature vector, a first trajectory template associated with the first object and a second trajectory template associated with the second object. The first trajectory template and the second trajectory template may represent classifications of intent for movement associated with the first object and the second object, respectively. For example, the first trajectory template may represent a general (or coarse) intended movement of the first object in the future (from a time T=0) and the second trajectory template may represent a general intended movement of the second object in the future. In some examples, the trajectory template may be represented by one or more future locations in a grid, determined by binning potential locations of the objects in the future, performing velocity analysis at a time prior to T=0, at time T=0, etc., and/or utilizing clustering algorithms on historical locations and/or potential locations (e.g., binned or otherwise) of the objects.

In various examples, the first trajectory template and the second trajectory template may be determined utilizing a template network, such as template network 316 of FIG. 3 and/or template network 420 of FIG. 4. The template network may represent a neural network (e.g., CNN) configured to output one or more trajectory templates. The template network may output the trajectory templates based on input feature vectors. In some examples, the template network may be configured to output the trajectory template(s) based on sensor data, multi-channel images, and/or the feature map determined therefrom.

At operation 612, the process may include determining a first predicted trajectory associated with the first object based at least in part on the first feature vector and the first trajectory template and a second predicted trajectory associated with the second object based at least in part on the second feature vector and the second trajectory template. In various examples, the first predicted trajectory and the second predicted trajectory may be determined utilizing one or more neural networks. In some examples, the network(s) may include dense neural network(s).

In some examples, a single neural network may be utilized to determine the first predicted trajectory and the second predicted trajectory. In such examples, the neural network may be configured to determine trajectories regardless of intent (e.g., one neural network determines trajectories associated with all trajectory templates). In various examples, a first neural network may be utilized to determine the first predicted trajectory and a second neural network may be utilized to determine the second predicted trajectory. In such examples, the first trajectory template and the second trajectory template, from which the first predicted trajectory and the second predicted trajectory may be based, may represent different classifications of intent of the first object and the second object. For example, the first object may have associated therewith a first trajectory template including a movement to the left and the second object may have associated therewith a second trajectory template including movement to the right. Though any other movements are contemplated (e.g., going straight, slight right, slight left, hard right, hard left, etc.).

Example Clauses

A: A computer-implemented method comprising: receiving sensor data of an environment captured by a sensor of an autonomous vehicle; generating, based at least in part on the sensor data, a multi-channel image representing a top-down view of the environment, the multi-channel image representing a bounding box associated with an object in the environment inputting the multi-channel image into a machine learned model; receiving, from the machine learned model, a trajectory template indicative of a class of motion associated with the object and a predicted trajectory associated with the object; and controlling the autonomous vehicle based at least in part on at least one of the trajectory template or the predicted trajectory.

B: The computer-implemented method of paragraph A, wherein: the object is a first object; the multi-channel image comprises data associated with a second object; the trajectory template is a first trajectory template; and the first trajectory template and a second trajectory template are based at least in part an interaction between the first object and the second object.

C: The computer-implemented method of either paragraph A or paragraph B, wherein the machine learned model comprises: a first neural network to output a feature map determined based at least in part on a history of the object in the environment; a second neural network to output the trajectory template based at least in part on a feature vector associated with the feature map; and a third neural network to output the predicted trajectory based at least in part on the trajectory template and the feature vector.

D: The computer-implemented method of paragraph C, wherein: the second neural network is further configured to output a heat map associated with the object; and the autonomous vehicle is further controlled based at least in part on the heat map.

E: The computer-implemented method of paragraph C, wherein the third neural network outputs the predicted trajectory based at least in part on a first classification of trajectory templates and wherein the machine learned model further comprises: a fourth neural network to output the predicted trajectory based at least in part on a second classification of the trajectory templates and the feature vector, the method further comprising inputting the trajectory template into one or more of the third neural network or the fourth neural network based at least in part on a classification associated with the trajectory template.

F: A system or device comprising: a processor; and a non-transitory computer-readable medium storing instructions that, when executed, cause a processor to perform a computer-implemented method as any one of paragraphs A-E describe.

G: A system or device comprising: a means for processing; and a means for storing coupled to the means for processing, the means for storing including instructions to configure one or more devices to perform a computer-implemented method as any one of paragraphs A-E describe.

H: A system comprising: one or more processors; and one or more computer-readable media storing instructions executable by the one or more processors, wherein the instructions, when executed, cause the system to perform operations comprising: receiving data representing an object in an environment; generating, based at least in part on the data, an image representing a top-down view of the environment, the image representing the object and motion information associated with the object; inputting the image into a machine learned model; and receiving, from the machine learned model, a trajectory template and a predicted trajectory associated with the object, the trajectory template indicative of a class of motion associated with the object.

I: The system of paragraph H, wherein the predicted trajectory is represented as a heat map comprising prediction probabilities of possible locations associated with the object.

J: The system of either paragraph H or paragraph I, wherein the machine learned model comprises: a first neural network to output a feature map; a second neural network to output the trajectory template based at least in part on a portion of the feature map associated with the object; and a third neural network to output the predicted trajectory based at least in part on the trajectory template.

K: The system of paragraph J, wherein the third neural network outputs the predicted trajectory based at least in part on a plurality of trajectory templates.

L: The system of paragraph J, wherein the third neural network outputs the predicted trajectory based at least in part on a first classification of the trajectory template, the machine learned model further comprising: a fourth neural network to output the predicted trajectory based at least in part on a second classification of the trajectory template.

M: The system of paragraph J, wherein: the object data comprises data associated with two or more objects in the environment; and the feature map comprises joint history data of the two or more objects determined in the environment.

N: The system of any one of paragraphs H-M, wherein: the image further comprises one or more channels comprising additional object information of additional objects in the environment; and the image is one of a plurality of images associated with one or more previous times prior to a current time.

O: The system of paragraph N, wherein the image represents an interaction between the object and the additional objects and wherein the predicted trajectory and at least one other predicted trajectory associated with an additional object are based at least in part the interaction.

P: The system of any one of paragraphs H-O, the operations further comprising causing the system to control a vehicle based at least in part on at least one of the trajectory template or the predicted trajectory associated with the object.

Q: The system of any one of paragraphs H-P, wherein the image is a multi-channel image comprising at least one of: semantic data associated with object; velocity data associated with the object; acceleration data associated with the object; scenario data associated with the environment; a road network associated with the environment; or vehicle data associated with a vehicle in the environment.

R: The system of any one of paragraphs H-Q, wherein the machine learned model is trained to: determine the trajectory template based at least in part on a clustering algorithm; and determine the predicted trajectory based at least in part on a regression algorithm.

S: One or more non-transitory computer-readable media storing instructions that, when executed, cause one or more processors to perform operations comprising: receiving data representing an object in an environment; generating, based at least in part on the data, an image representing at least a top-down view of the environment; inputting the image into a machine learned model; and receiving, from the machine learned model, a trajectory template and a predicted trajectory associated with the object, the trajectory template indicative of a class of motion associated with the object.

T: The one or more non-transitory computer-readable media of paragraph S, wherein the image is a multi-channel image comprising at least one of: semantic data associated with object; velocity data associated with the object; acceleration data associated with the object; scenario data associated with the environment; a road network associated with the environment; or vehicle data associated with a vehicle in the environment.

U: The one or more non-transitory computer-readable media of either paragraph S or paragraph T, wherein the machine learned model comprises: a first neural network to output the trajectory template; and at least one second neural network to output the predicted trajectory based at least in part on the output trajectory template.

V: The one or more non-transitory computer-readable media of any one of paragraphs S-U, wherein the operations further comprise: controlling a vehicle based at least in part on at least one of the trajectory template or the predicted trajectory associated with the object.

While the example clauses described above are described with respect to one particular implementation, it should be understood that, in the context of this document, the content of the example clauses can also be implemented via a method, device, system, computer-readable medium, and/or another implementation. Additionally, any of examples A-V may be implemented alone or in combination with any other one or more of the examples A-V.

Conclusion

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method comprising:
receiving data associated with an object in an environment;
generating, based at least in part on the data, an image representing a top-down view of the environment;
inputting the image into a machine learned model trained to determine a trajectory template based at least in part on an unsupervised learning algorithm; and
receiving, from the machine learned model, the trajectory template, wherein the trajectory template is indicative of a predicted trajectory associated with the object.

2. The method of claim 1, wherein the machine learned model is further trained to determine the trajectory template based at least in part an interaction between the object and a second object in the environment.

3. The method of claim 1, wherein the image comprises joint history data of the object and a second object in the environment.

4. The method of claim 1, wherein:
the machine learned model comprises:
a first neural network configured to output the trajectory template; and
a second neural network configured to output a representation of a discretized region of the environment; and
the method further comprises controlling an autonomous vehicle based at least in part on the representation of the discretized region of the environment.

5. The method of claim 1, wherein the machine learned model comprises a neural network configured to output the trajectory template based at least in part on a classification of the trajectory template.

6. The method of claim 1, wherein the image comprises at least one of:
semantic data associated with object;
velocity data associated with the object;
acceleration data associated with the object;
scenario data associated with the environment;
a road network associated with the environment; or
vehicle data associated with a vehicle in the environment.

7. A system comprising:
one or more processors; and
one or more computer-readable media storing instructions executable by the one or more processors, wherein the instructions, when executed, cause the system to perform operations comprising:
receiving data associated with an object in an environment;
generating, based at least in part on the data, an image representing a top-down view of the environment;
inputting the image into a machine learned model trained to determine a trajectory template based at least in part on an unsupervised learning algorithm; and
receiving, from the machine learned model, the trajectory template, wherein the trajectory template is indicative of a predicted trajectory associated with the object.

8. The system of claim 7, wherein the machine learned model comprises:
a first neural network configured to output the trajectory template based at least in part on a feature vector associated with the object; and
a second neural network configured to output the predicted trajectory based at least in part on the trajectory template and the feature vector.

9. The system of claim 8, wherein the second neural network is further configured to output a representation of a discretized region of the environment.

10. The system of claim 7, wherein the machine learned model comprises a neural network configured to output the predicted trajectory based at least in part on a second trajectory template associated with a second object in the environment.

11. The system of claim 7, wherein the machine learned model comprises a neural network configured to:
determine a classification of the object; and
determine the predicted trajectory based at least in part on the classification of the object.

12. The system of claim 11, wherein the classification of the object comprises at least one of an object type or an object intent.

13. The system of claim 7, wherein:
the image comprises one or more channels comprising additional object information of one or more additional objects in the environment; and
the image is one of a plurality of images associated with one or more previous times prior to a current time.

14. The system of claim 7, wherein:
the image represents an interaction between the object and one or more additional objects; and
the predicted trajectory and at least one other predicted trajectory associated with the one or more additional objects are based at least in part the interaction.

15. One or more non-transitory computer-readable media storing instructions that, when executed, cause one or more processors to perform operations comprising:
receiving data associated with an object in an environment;
generating, based at least in part on the data, an image representing at least a top-down view of the environment;
inputting the image into a machine learned model trained to determine a trajectory template based at least in part on an unsupervised learning algorithm; and
receiving, from the machine learned model, the trajectory template, wherein the trajectory template is indicative of a predicted trajectory associated with the object.

16. The one or more non-transitory computer-readable media of claim 15, wherein the machine learned model comprises:
a first neural network to output a feature map comprising a feature vector associated with the object; and
a second neural network to output the trajectory template based at least in part on the feature map.

17. The one or more non-transitory computer-readable media of claim 16, wherein the feature map comprises joint history data of the object and a second object in the environment.

18. The one or more non-transitory computer-readable media of claim 15, wherein:
the machine learned model comprises:
a first neural network configured to output the predicted trajectory based at least in part on a first classification of trajectory templates; and a second neural network configured to output the predicted trajectory based at least in part on a second classification of trajectory templates; and the operations further comprise inputting the trajectory template into one or more of the first neural network or the second neural network based at least in part on a classification of the trajectory template.

19. The one or more non-transitory computer-readable media of claim 15, wherein the machine learned model comprises:

a first neural network configured to output the trajectory template; and a second neural network configured to output the predicted trajectory based at least in part on the trajectory template.

20. The one or more non-transitory computer-readable media of claim 15, wherein the operations further comprise controlling a vehicle based at least in part on at least one of the trajectory template or the predicted trajectory.

* * * * *